United States Patent [19]

Iggulden et al.

[11] Patent Number: 5,001,749
[45] Date of Patent: Mar. 19, 1991

[54] THERMALLY-ACTIVATED RECEIVING MEDIUM FOR USE IN A FACSIMILE TRANSMISSION SYSTEM

[76] Inventors: Jerry R. Iggulden, 21600 Cleardale St., Santa Clarita, Calif. 91321; Donald A. Streck, 832 Country Dr., Ojai, Calif. 93023

[21] Appl. No.: 341,756

[22] Filed: Apr. 21, 1989

Related U.S. Application Data

[63] Continuation-in-part of Ser. No. 326,975, Mar. 22, 1989, Pat. No. 4,916,739, which is a continuation-in-part of Ser. No. 312,700, Feb. 21, 1989, Pat. No. 4,912,761, which is a continuation-in-part of Ser. No. 175,947, Mar. 31, 1988, abandoned.

[51] Int. Cl.$^5$ .......................... H04N 1/44; G09C 5/00
[52] U.S. Cl. ......................................... 380/18; 380/54; 283/17; 355/201
[58] Field of Search ....................... 380/6, 9, 18, 51, 54, 380/55, 59; 283/17, 73, 901; 355/201

[56] References Cited

U.S. PATENT DOCUMENTS

| | | | |
|---|---|---|---|
| 2,343,290 | 3/1944 | Francis | 380/9 |
| 2,417,163 | 3/1947 | Horst | 380/54 |
| 2,437,255 | 3/1948 | Hogan et al. | 380/54 |
| 2,795,705 | 6/1957 | Rabinow | 380/54 X |
| 2,952,080 | 9/1960 | Avakian et al. | 380/54 |
| 3,084,453 | 4/1963 | Brown | 380/54 |
| 3,279,095 | 10/1966 | Carlson | 380/54 |
| 3,621,589 | 11/1971 | Jones et al. | 380/54 |
| 3,914,877 | 10/1975 | Hines | 380/54 |
| 4,586,711 | 5/1986 | Winters et al. | 380/54 X |
| 4,776,013 | 10/1988 | Kafri et al. | 380/54 |
| 4,821,321 | 4/1989 | Bramley | 380/54 |

Primary Examiner—Stephen C. Buczinski
Assistant Examiner—Bernarr Earl Gregory
Attorney, Agent, or Firm—Donald A. Streck

[57] ABSTRACT

A printing medium for the printing of images thereon to form a document by the printer of a standard facsimile machine in a manner which renders the document unreadable to a casual observer. There is a strip of a flexible printing medium receivable by the facsimile machine for passage therethrough past the printer thereof. The printing medium has a surface for receiving an image from the printer. Additionally, there is a strip of an obscuring medium removably attached to the printing medium along an edge thereof in a manner which will allow the obscuring medium to pass through the facsimile machine in combination with the printing medium. The obscuring medium has an obscuring portion covering a printing surface of the printing medium upon which the printer prints images for rendering printing on the printing medium unreadable to a casual observer. Four embodiments are disclosed for use in both thermal and plain paper facsimile machines.

14 Claims, 2 Drawing Sheets

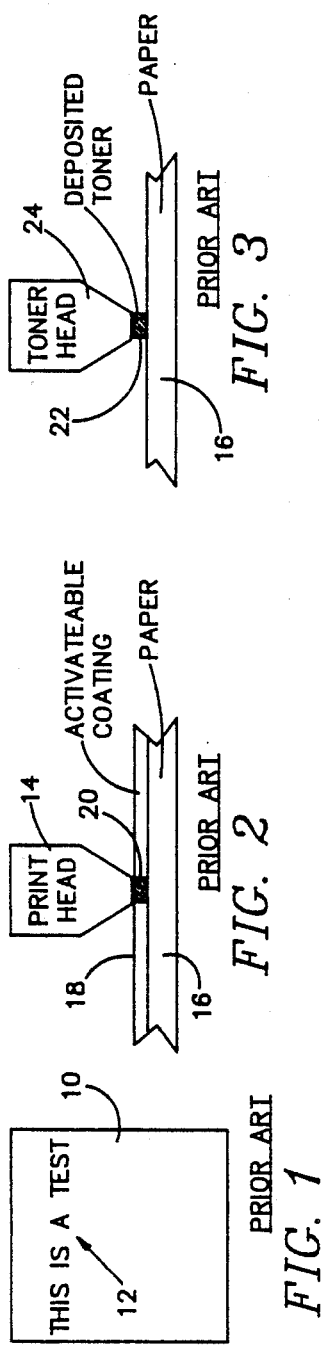

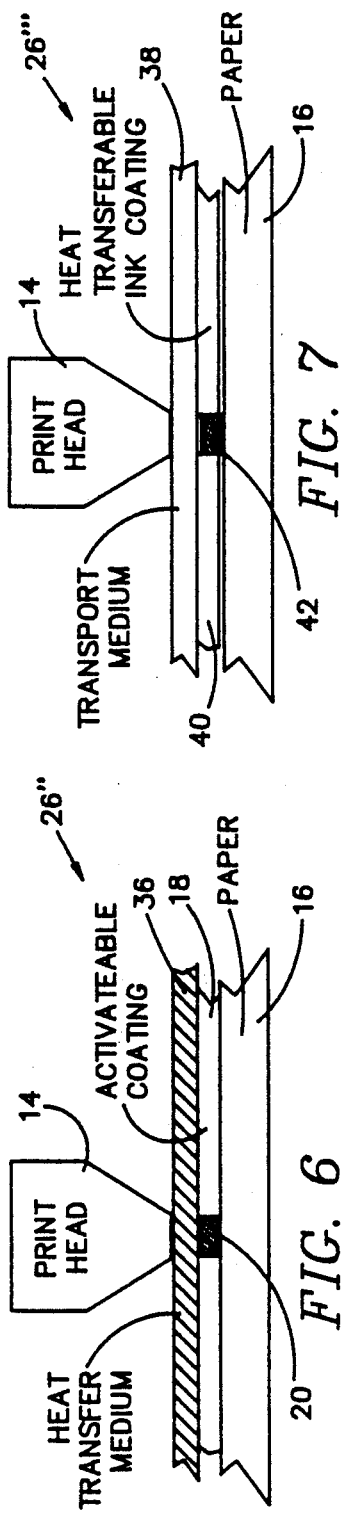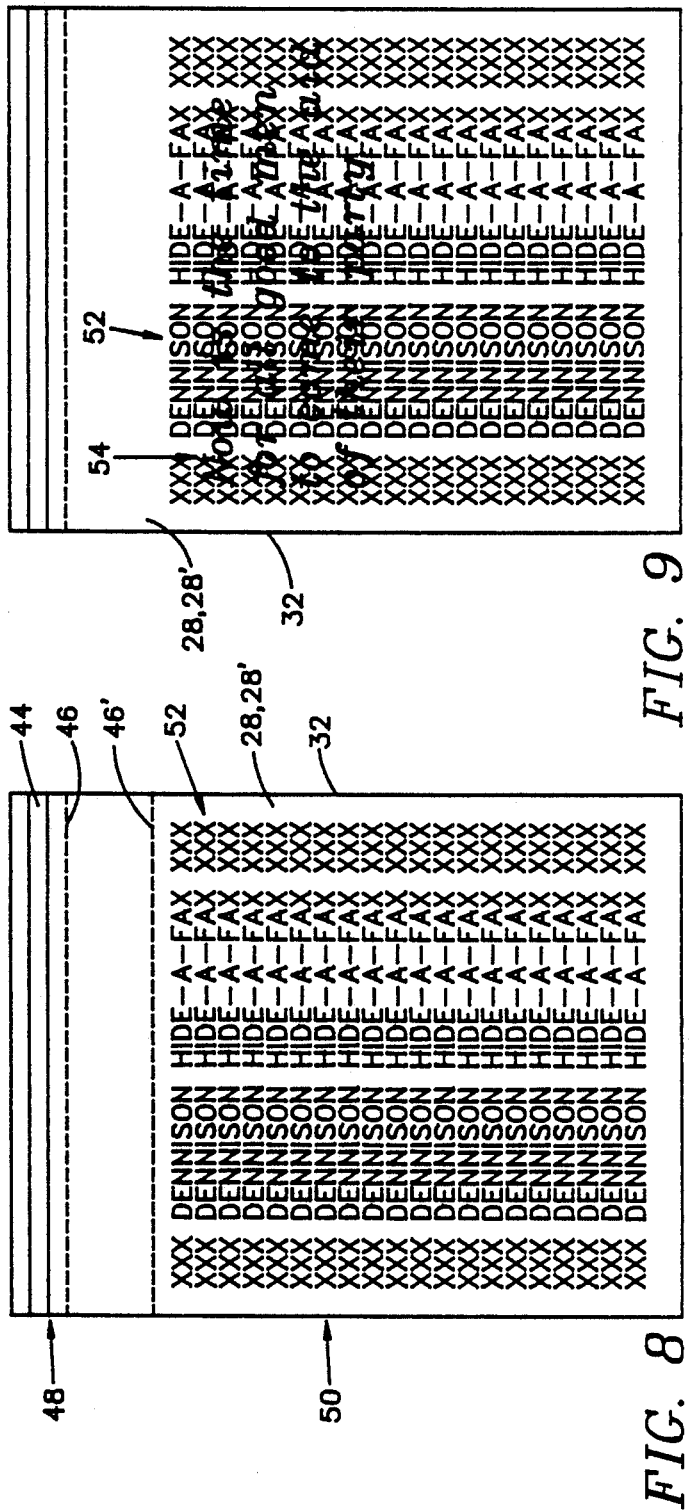

THERMALLY-ACTIVATED RECEIVING MEDIUM FOR USE IN A FACSIMILE TRANSMISSION SYSTEM

This application is a continuation-in-part of application Ser. No. 326,975, filed 22 Mar. 1989, now U.S. Pat. No. 4,916,739, which, in turn, is a continuation-in-part of application Ser. No. 312,700, filed 21 Feb. 1989, now U.S. Pat. No. 4,912,761, which, in turn, is a continuation-in-part of application Ser. No. 175,947, filed 31 Mar. 1988, now abandoned.

BACKGROUND OF THE INVENTION

This invention relates to facsimile transmission systems and methods for sending a document between a sender and a receiver by facsimile in a manner which prevents unauthorized casual reading of the document, and, more particularly, to a printing medium for the printing of images thereon to form a document by the printer of a standard facsimile machine in a manner which renders the document unreadable to a casual observer comprising a strip of a flexible printing medium receivable by the facsimile machine for passage therethrough past the printer thereof, said printing medium having a surface for receiving an image from the printer; and, a strip of an obscuring medium removably attached to the printing medium along an edge thereof in a manner which will allow the obscuring medium to pass through the facsimile machine in combination with the printing medium, the obscuring medium having an obscuring portion covering a printing surface of the printing medium upon which the printer prints images for rendering printing on the printing medium unreadable to a casual observer.

In the above-referenced, co-pending '700 application, the teachings of which are incorporated herein by reference, a method and associated apparatus is disclosed by means of which a document can be transmitted between a sender and a receiver by facsimile in a manner which prevents unauthorized casual reading of the document. A pair of patterns are alternately placed over the document while it is scanned (either by a photocopy machine or the scanning head of a facsimile machine). Each pattern contains white portions on a transparent background thus creating transparent portions. The patterns are complementary and mutually exclusive; that is, the "A" pattern has white portions where the "B" pattern has transparent portions, and also vice versa. Thus, when a document is scanned through the "A" pattern, a first partial document is produced. Similarly, when the document is scanned through the "B" pattern, a second partial document is produced. The partial documents can also be produced by software operating on a document produced by a word processing program. Regardless of the method of origination, the two partial documents are then transmitted by facsimile to the receiver. At the receiving end, the two partial documents are difficult to read and understand, at least to the casual observer. To "read" the original document, the intended receiver makes a copy of one of the two partial documents on a transparency and only has to place the transparency over the other partial document in proper registration in order to view (and copy, if desired) the reconstructed document.

In the above-referenced, co-pending '975 application, the teachings of which are also incorporated herein by reference, a method and associated apparatus are disclosed whereby the transparency and the other partial document are adhesively connected together to form a complete document which can be stored, copied, read, etc., with convenience.

As will be recognized readily by those skilled in the art, the foregoing methods and apparatus of the co-pending applications of which this is a continuation-in-part are directed to a security facsimile transmission system wherein the secure transmission is initiated by the sender. What is also needed is a security facsimile transmission system wherein the secure transmission can be under the control of the receiver.

Wherefore, it is the object of this invention to provide a facsimile transmission receiving medium onto which a received facsimile from a standard facsimile machine can be printed in a manner which will make the resultant copy virtually unreadable to the casual observer.

It is another object of this invention to provide a facsimile transmission receiving medium onto which a received facsimile can be printed in a manner which will make the resultant copy virtually unreadable to the casual observer whether the standard facsimile machine receiving and printing the document being transmitted is of the thermal printing variety or of the type printing on plain paper employing a toner.

Other objects and benefits of this invention will become apparent from the detailed description which follows hereinafter when taken in conjunction with the drawing figures which accompany it.

SUMMARY

The foregoing object has been achieved in the printing medium of the present invention for the printing of images thereon to form a document by the printer of a standard facsimile machine in a manner which renders the document unreadable to a casual observer. The printing medium comprises, a strip of a flexible printing medium receivable by the facsimile machine for passage therethrough past the printer thereof, the printing medium having a surface for receiving an image from the printer; and, a strip of an obscuring medium removably attached to the printing medium along an edge thereof in a manner which will allow the obscuring medium to pass through the facsimile machine in combination with the printing medium, the obscuring medium having an obscuring portion covering a printing surface of the printing medium upon which the printer prints images for rendering printing on the printing medium unreadable to a casual observer.

In one embodiment, the printer of the facsimile machine is adapted to print images on plain paper by applying and fusing a toner thereto. In that embodiment, the printing medium is a transparency having a top surface adapted to receive and have toner images fused thereto and the obscuring medium is a backing sheet covering a bottom surface of the transparency opposite the top surface and the obscuring portion comprises an interference pattern on the backing sheet facing the bottom surface of the transparency to be seen through the transparency whereby images produced on the top surface and viewed in combination with the interference pattern are unreadable to at least a casual observer.

In another embodiment, the printer of the facsimile machine is adapted to print images on thermal paper by applying heat to a surface coating thereof which changes to a dark and visible color in response to the heat. In that embodiment, the printing medium is a transparency having a top surface having a coating thereon which changes to a dark and visible color in response to heat; and, the obscuring medium is a backing sheet covering a bottom surface of the transparency opposite the top surface and the obscuring portion comprises an interference pattern on the backing sheet facing the bottom surface of the transparency to be seen through the transparency whereby images produced on the top surface and viewed in combination with the interference pattern are unreadable to at least a casual observer.

In yet another embodiment, the printer of the facsimile machine is adapted to print images on thermal paper by applying heat to a surface coating thereof which changes to a dark and visible color in response to the heat. In that embodiment, the printing medium is a thermal paper having a top surface having a coating thereon which changes to a dark and visible color in response to heat; and, the obscuring medium is a covering sheet covering the top surface of the thermal paper, the covering sheet being of a thin plastic impregnated with a material having a high index of thermal conductivity and capable of quickly transmitting heat from the printhead vertically through the obscuring medium to the coating on the thermal paper, the obscuring portion of the covering sheet containing means for preventing images produced on the top surface from being read through the obscuring medium at least by a casual observer. The preferred material having a high index of thermal conductivity is a powdered to finely granulated metal. Additionally, the plastic of the covering sheet is frangible whereby the plastic can be cut by a transverse cutter of a facsimile machine which cuts roll media into sheet lengths.

In still another embodiment, the printer of the facsimile machine is adapted to print images on thermal paper by applying heat to a surface coating thereof which changes to a dark and visible color in response to the heat. In that embodiment, the printing medium is a plain paper having a top surface; and, the obscuring medium is a covering sheet covering the top surface of the plain paper, the covering sheet having a heat-transferable ink coating on a bottom surface thereof facing the top surface of the plain paper whereby when the printer applies heat to the obscuring medium the ink adjacent thereto is transferred from the obscuring medium to the top surface of the plain paper, the obscuring portion of the covering sheet containing means for preventing images produced on the top surface from being read through the obscuring medium at least by a casual observer. Additionally, the covering sheet is frangible whereby the covering sheet can be cut by a transverse cutter of a facsimile machine which cuts roll media into sheet lengths.

DESCRIPTION OF THE DRAWINGS

FIG. 1 is a simplified drawing of a document received and printed according to prior art methods and materials where the resultant printing is readily readable by the casual observer.

FIG. 2 is a simplified drawing depicting the printing process and materials of a prior art thermal paper facsimile machine.

FIG. 3 is a simplified drawing depicting the printing process and materials of a prior art plain paper facsimile machine.

FIG. 4 is a simplified drawing depicting the printing process and materials of a plain paper facsimile machine employing the methods and materials of the present invention.

FIG. 5 is a simplified drawing depicting the printing process and materials of a thermally operated facsimile machine employing the methods and materials of the present invention in a first embodiment.

FIG. 6 is a simplified drawing depicting the printing process and materials of a thermally operated facsimile machine employing the methods and materials of the present invention in a second embodiment.

FIG. 7 is a simplified drawing depicting the printing process and materials of a thermally operated facsimile machine employing the methods and materials of the present invention in a third embodiment.

FIG. 8 is a simplified plan view of a transparent printing medium on a backing sheet having an interference pattern thereon according to one aspect of the present invention.

FIG. 9 shows the printing medium of FIG. 8 with a message printed on the transparent portion depicting how the interference pattern seen through the transparent portion renders the message unreadable to the casual observer.

DESCRIPTION OF THE PREFERRED EMBODIMENT:

The transparency of the above-referenced, co-pending '975 application of which this is a continuation-in-part comprises a rectangular sheet of a photocopyable plastic material of a type well known in the art for such purposes. In one embodiment, the plastic material has score lines formed along the side edges and parallel thereto. The score lines are located about ¼ to ⅜ inch from the edges and can be formed by any of several manufacturing techniques well known in the art such as mechanical scoring or laser cutting. The strips between the score lines and the edges and a portion on the inner sides of the score lines have a thin, transparent, adhesive tape applied thereto. Thus, the transparency will feed through a typical photocopy machine without problem. In use, when the transparency has been placed in registration on the partial document and the two are being held together in registration, the strips are lifted to break the transparency along the score lines. The tape is then folded back and the strips peeled therefrom. The tape is then used to adhesively attach the transparency to the document portion. The adhesive can also take other forms as disclosed in that co-pending application. Since the plastic material used for such photocopyable transparencies is quite thin, it can be rolled back at the corners and/or along the edges, for example, to activate an adhesive strip or spot. In this approach, the score lines as described above are unnecessary. A two-sided adhesive material has one of its protective coverings removed and it is adhesively attached with its thus exposed adhesive surface to the bottom of the plastic material in a desired position (as, for example, along the top edge). Its other protective covering is left on. Again, using thin materials for the adhesive material and remaining protective covering, the transparency should pass through a typical photocopy machine without incident. With this approach, it is preferred that the remaining protective covering have a tab of some sort extending therefrom which can be grasped and pulled to remove the protective covering and expose the adhesive material. With the tab, the edge of the transparency does not have to be lifted as high in order to remove the protective covering from the adhesive material. When the transparency is positioned over the partial document and with the two held together, the tab is simply grasped and pulled to pull the protective covering off the adhesive material and out from between the transparency and the partial document so that the adhesive material can bind the two together. As will be seen from the description which follows hereinafter, this latter described embodiment of the transparency of the above-referenced co-pending application can be conveniently adapted to be employed in both the sender-initiated methods of the above-referenced co-pending applications as well as the receiver-controlled method of this application.

Turning first to FIG. 1, a document 10 received and printed according to prior art methods and materials is depicted where the resultant printing 12 is readily readable by the casual observer. As mentioned earlier, in a typical prior art standard facsimile machine as available in the marketplace today, the printing 12 of FIG. 1 is accomplished in one of two ways. As depicted in FIG. 2, the most common way is the use of a thermal printhead 14. According to latest figures, this approach accounts for approximately 75% of the facsimile machines presently in use. The printing medium is a roll of paper 16 having a thermally activated coating 18 thereon. The printhead 14 extends transversely across the width of the paper 16 which moves under the printhead during the printing process. The printhead 14 comprises a plurality of heating resistors (not shown) which can be individually heated by the application of a current thereto. When a resistor of the printhead 14 at a particular pixel location is activated and heated to a threshold temperature, the coating 18 thereunder is turned black, as indicated at 20 in the drawing of FIG. 2, thereby creating a visible spot. In a plain paper facsimile machine (as in a xerographic process photocopy machine or a so-called "laser printer"), the process of FIG. 3 (shown in greatly simplified form) takes place. The image to be created on a sheet of paper 16 is created by the depositing of toner 22 from a toner head 24 (or the like) onto the paper 16. It is thereafter "fused" into the surface of the paper 16 by a heating process. How these processes are accomplished employing the printing mediums of this invention to create non-readable images will now be described.

Turning first to FIG. 4, a security medium, generally indicated as 26, is shown employed with a plain paper facsimile printing system such as that of FIG. 3. The printing medium 26 comprises a transparency 28 of the type generally shown and described in co-pending application '975. The transparency 28 has an upper surface 30 adapted to receive a toner image and have it thermally fused thereto. A backing sheet 32 is attached to the bottom of the transparency 28. Preferably, the backing sheet 32 is of paper and comprises the "tab" covering the adhesive material (which was mentioned above) removably holding the backing sheet 32 to the transparency 28 in a manner to be described in greater detail shortly so that the medium 26 can also be used as a "FaxOver" in the sender-initiated method and thereby serve a dual purpose. The top surface 34 of the backing sheet 32 has an interference pattern thereon (not shown in this drawing) which interferes with the ability of a casual observer to read an image on the upper surface 30 of the transparency 28 since the interference pattern is also seen simultaneously with the image. The interference pattern is preferably a pattern of lines which creates a confusion factor. As those skilled in the art will readily appreciated, it could also be a regular pattern of some sort or a solid dark color substantially the same as that of the toner 22. To view the image, the backing sheet 32 is replaced with a sheet of white, which makes the image visible against the white background.

Turning now to FIG. 4, a security medium, this time generally indicated as 26', is shown employed with a thermally operated facsimile printing system such as that of FIG. 2. The printing medium 26' again comprises a transparency 28'. In this embodiment, however, the transparency 28' has a heat-activated coating 18' on the upper surface 30 thereof which is adapted to be thermally activated in the manner of the coating 18 on the paper 16 of FIG. 2. The result of the printing operation by the printhead 14 is, therefore, substantially identical to that of the prior embodiment; that is, black images (i.e. activated "black" portions 20') created on the top surface 30 of a transparent sheet (i.e. the transparency 28'). A paper backing sheet 32 is again attached to the bottom of the transparency 28' and also again the backing sheet 32 preferably comprises the "tab" covering the adhesive material so that the medium 26' can also be used as a "FaxOver" in the sender-initiated method and thereby serve a dual purpose. The top surface 34 of the backing sheet 32 again has an interference pattern thereon so as to interfere with the ability of a casual observer to read an image on the upper surface 30 of the transparency 28'. As in the prior embodiment, to view the image, the backing sheet 32 is replaced with a sheet of white to make the black image visible against a plain white background.

Two alternate methods and materials for use with the thermally operated printing process of FIG. 2 are shown in FIGS. 6 and 7. In the medium 26" of FIG. 6, the paper 16 having the prior art heat activated coating 18 thereon has a removeable, thin, opaque, heat transfer medium 36 thereon. Alternatively, the transfer medium 36 can be translucent or have an interference pattern printed thereon. The object is to be unable to see through the medium 36 and easily read images produced on the paper 16 in the coating 18 thereof. The preferred medium 36 is a thin plastic impregnated with a powdered or finely granulated metal having a high index of thermal conductivity such as aluminum. Note that since the thermal facsimile machines are typically set up to employ a roll printing medium which is cut to lengths by a built in rolling cutter, the plastic of the medium must be a frangible material which can be cut by a rolling cutter or it will jam the cutter. Thus, when the printhead 14 heats a particular pixel position, the heat generated is passed quickly and vertically through the medium 36 to activate the adjacent pixel position of the coating 18 and thereby create a visible spot (i.e. an activated and black region 20) at that position. To view the document in this embodiment, the transfer medium 36 must be removed to expose the underlying paper 16 with the printing thereon.

In the medium 26''' of FIG. 7, a plain white paper is employed as the paper 16. A transport medium 38 having a prior art heat transferred ink 40 thereon is disposed over the paper 16. Such materials are well known in the art and typically are employed as the "ribbon" of a plain paper thermal printer. The "ink" 40 is actually a colored wax-based material which is non-transferable at standard temperature; but, which melts and then transfers and fuses to the surface of the paper 16, as at 38, when subjected to a temperature substantially the same as that employed to activate the coating 18 as described earlier herein. While in printer ribbons the medium 36 is typically of a thin tough plastic such as Mylar, or the like, in this application it is preferred that the transport medium 38 be of a less costly (and frangible) material such as a lightweight paper. To view the document in this embodiment after printing, the transport medium 38 must be removed to expose the printing on the underlying paper 16. It is preferred (but not necessary) that an additional obscuring means be added to the transport medium 38 in addition to that provided by the ink 40. This can be provided by printing an interfering pattern (which as previously can include a solid color) on the top surface of the transport medium 38 opposite the ink 40.

Turning now to FIGS. 8 and 9 the operation of the preferred dual-purpose transparency 28, 28' with a backing sheet 32 as described with respect to the embodiments of FIGS. 4 and 5 will now be addressed in greater detail. The transparency 28, 28' has a strip of adhesive material 44 adjacent at least one edge. Preferably, the adhesive material 44 is disposed at the top edge (which is the leading edge through a facsimile machine's print path). If desired, the adhesive material 44 can be employed along the top and bottom edges or even all four edges to create a true "envelope" for each page of a received facsimile document. If desired, the backing sheet 32 can be held to the transparency 28, 28' over the entire surface thereof such as by using one of the easily released adhesives presently available for use in temporarily and releaseably attaching a piece of paper to a surface (including another piece of paper) without causing damage thereto when removed. The backing sheet 32 is attached to the other side of the adhesive material 42. Thus, the backing sheet 32 forms an extended "tab" as referred to in the above-referenced co-pending '975 application. Preferably, the backing sheet 32 has a line of perforations 46 transversely thereacross adjacent the adhesive material 44 such that the backing sheet 32 can be easily separated. The perforations 46 divide the backing sheet 32 into an attaching strip 48 and an obscuring portion 50. It is also preferred that additional transverse perforations 46' be spaced vertically along the length of the backing sheet 32 so that a portion can be removed on first sheets in order to see and read the identity of the intended receiver. Where an adhesive fastening along the side edges is employed, vertical perforations adjacent thereto are also preferred. Of course, where a facsimile cover sheet is employed (as is done according to good facsimile etiquette), the entire backing sheet 32 can be removed from the first (i.e. cover) sheet to identify the addressee. It should be noted in passing that in the embodiments of FIGS. 6 and 7 the paper 16 is preferably attached to the overlying heat transfer medium 36 and transport medium 38, respectively, by adhesive fastening along the side edges with adjacent perforations for easy separation. In all cases, it is preferred that the perforations 46, 46', etc. be formed by a laser cutting process which separates easily and produces no bits of paper to get into working parts of adjacent electromechanical apparatus. As can be seen from the drawings, the interference pattern 52 is contained in the obscuring portion 50 over the area which can contain image on the overlying transparency 28, 28'. The effect of the interference pattern 52 can be seen in FIG. 9 where the expression "Now is the time for all good men to come to the aid of their party", generally indicated as 54, has been printed on the transparency 28, 28'. As can be seen, the interference pattern 52 makes the reading of the expression difficult to impossible—at least to the casual observer, who is the intended party to be excluded from reading of documents by the present invention.

In the preferred embodiment, the attaching strip 48 is white in color so as to activate any copy machine with which it is used in its dual mode of use requiring same. Also in the preferred embodiment, the back of the obscuring portion 50 is white so as to also provide the necessary white background necessary for reading an image on the transparency 28, 28'. To use the preferred embodiment for viewing the image, the obscuring portion 50 is removed at the perforations 46 and reversed to use the white back side. The attaching portion is then peeled from the adhesive material 44 and the adhesive material 44 used to attach the white back side of the obscuring portion 50 to the transparency 28, 28' whereby the image is made visible.

A preferred aspect of the invention in all embodiment is to initially fasten the printing medium to the obscuring medium in a manner which will disclose if the obscuring medium has been removed from the printing medium sufficiently for a document printed on the printing medium to be read.

Wherefore, having thus described our invention, what is claimed is:

1. A printing medium for the printing of images thereon to form a document by the printer of a standard facsimile machine in a manner which renders the document unreadable to a casual observer comprising:
   (a) a strip of a flexible printing medium receivable by the facsimile machine for passage therethrough past the printer thereof, said printing medium having a surface for receiving an image from the printer; and,
   (b) a strip of an obscuring medium disposed over a surface of said printing medium so as to pass through the facsimile machine in combination with said printing medium, said obscuring medium having an obscuring portion covering a printing surface of said printing medium upon which the printer prints images for rendering printing on said printing medium unreadable to a casual observer; wherein the printer of the facsimile machine is adapted to print images on thermal paper by applying heat to a surface coating thereof which changes to a dark and visible color in response to the heat and wherein additionally,
   (c) said printing medium is a thermal paper having a top surface having a coating thereon which changes to a dark and visible color in response to heat; and,
   (d) said obscuring medium is a covering sheet covering said top surface of said thermal paper, said covering sheet being of a thin material having a high index of thermal conductivity and capable of quickly transmitting heat from the printhead vertically through said obscuring medium to said coating on said thermal paper, said obscuring portion of said covering sheet containing means for preventing images produced on said top surface from being read through said obscuring medium at least by a casual observer.

2. The printing medium of claim 1 wherein:
   said covering sheet comprising said obscuring medium is impregnated with a powdered to finely granulated metal.

3. The printing medium of claim 1 wherein:

said covering sheet is a frangible material which can be cut by a transverse cutter of a facsimile machine which cuts roll media into sheet lengths.

4. A printing medium for the printing of images thereon to form a document by the printer of a standard facsimile machine in a manner which renders the document unreadable to a casual observer comprising:
  (a) a strip of a flexible printing medium receivable by the facsimile machine for passage therethrough past the printer thereof, said printing medium having a surface for receiving an image from the printer; and
  (b) a strip of an obscuring medium disposed over a surface of said printing medium so as to pass through the facsimile machine in combination with said printing medium, said obscuring medium having an obscuring portion covering a printing surface of said printing medium upon which the printer prints images for rendering printing on said printing medium unreadable to a casual observer; wherein the printer of the facsimile machine is adapted to print images on thermal paper by applying heat to a surface coating thereof which changes to a dark and visible color in response to the heat and wherein additionally,
  (c) said printing medium is a plain paper having a top surface; and,
  (d) said obscuring medium is a covering sheet covering said top surface of said plain paper, said covering sheet having a heat-transferable ink coating on a bottom surface thereof facing said top surface of said plain paper whereby when the printer applies heat to said obscuring medium said ink adjacent thereto is transferred from said obscuring medium to said top surface of said plain paper, said obscuring portion of said covering sheet containing means for preventing images produced on said top surface from being read through said obscuring medium at least by a casual observer.

5. The printing medium of claim 4 wherein:
said covering sheet is frangible whereby said covering sheet can be cut by a transverse cutter of a facsimile machine which cuts roll media into sheet lengths.

6. In a transparency comprising a rectangular sheet of a transparent plastic material having a surface for accepting and holding an image of a document for use in a secure facsimile transmission system wherein one of two partial documents each containing portions of an original document which are complementary and mutually exclusive is copied onto the transparency and overlayed on the other of the two partial documents in registration therewith to recreate the original document, the improvement for making the transparency doubly useful in a receiver-controlled secure facsimile system comprising:
  (a) an adhesive material disposed at an edge and on a bottom surface of the sheet of plastic material;
  (b) a removable backing sheet disposed over said adhesive material so as to allow the transparency to pass freely through a copy machine and be slid on the surface of a document without said adhesive material interfering therewith whereby after copying the one of two partial documents onto the transparency and placing it in registration on the other of the two partial documents said backing sheet can be removed in situ to bond the transparency to the one of the two partial documents, said removeable backing sheet also covering the entire said bottom surface of the sheet of plastic material and being disposed such as to pass through a standard facsimile machine and past a printhead thereof, said removeable backing sheet also having an obscuring portion disposed over a printing surface of the transparency upon which the printer prints images for rendering printing on the transparency unreadable to a casual observer, said obscuring portion comprising an interference pattern on said backing sheet facing a bottom surface of the transparency to be seen through the transparency in combination with images produced on the transparency whereby the transparency can be used as the receiving medium in a standard facsimile machine to provide a receiver-controlled secure receiving environment.

7. The improvement of claim 6 wherein the printer of a facsimile machine using the transparency is adapted to print images on plain paper by applying and fusing a toner thereto and wherein:
said transparency has a top surface adapted to receive and have toner images fused thereto.

8. The printing medium of claim 6 wherein the printer of a facsimile machine using the transparency is adapted to print images on thermal paper by applying heat to a surface coating thereof which changes to a dark and visible color in response to the heat and wherein:
said transparency has a top surface having a coating thereon which changes to a dark and visible color in response to heat.

9. A printing medium for the printing of images thereon to form a non-fading document by a thermal printer of a standard facsimile machine which cuts material from a roll printing medium into sheet lengths after printing thereon with a thermal printhead comprising:
  (a) a strip of a flexible, frangible, plain-surfaced printing paper receivable by the facsimile machine for passage therethrough past the printer thereof, said printing paper being cuttable by a sheet cutter of the facsimile machine;
  (b) a strip of a flexible, frangible, cover medium disposed over and rolled in combination with said printing paper so as to pass through the facsimile machine in combination with said printing paper, said cover medium being cuttable by the sheet cutter of the facsimile machine in combination with said printing paper; and,
  (c) a coating of a heat-transferable ink disposed on a central portion of a surface of said cover medium facing said printing paper, said ink being transferred from said cover medium to said printing paper upon the application of heat at a pixel position thereof by the thermal printhead of the facsimile machine.

10. The printing medium of claim 9 and additionally comprising:
an obscuring pattern disposed over said central portion of said cover medium on a surface thereof opposite said surface having said ink thereon whereby printing on said printing paper is obscured from reading until said cover medium is removed therefrom.

11. A roll printing medium for printing by a thermal printer of a standard facsimile machine which cuts material from a roll printing medium into sheet lengths with a cutter after printing thereon with a thermal printhead comprising:
- (a) an elongated strip of a plain-surfaced printing paper;
- (b) an elongated strip of a cover medium disposed over said printing paper so as to pass through the facsimile machine in combination with said printing paper, said printing paper and said cover medium being rolled into a supply roll and being of flexible, frangible, materials which are in combination cuttable by the cutter of the facsimile machine; and,
- (c) a heat-transferable ink disposed as a coating on a central portion of a surface of said cover medium facing said printing paper, said ink being transferred from said cover medium to said printing paper upon the application of heat at a pixel position thereof by the thermal printhead of the facsimile machine.

12. The printing medium of claim 11 and additionally comprising:
an obscuring pattern disposed over said central portion of said cover medium on a surface thereof opposite said surface having said ink thereon whereby printing on said printing paper is obscured from reading until said cover medium is removed therefrom.

13. In a facsimile transmission system whereby a document is sent between a sender and a receiver by facsimile and printed by a thermal printhead of a facsimile machine at the receiver, the improved printing media comprising:
- (a) a strip of a flexible printing medium receivable by the facsimile machine for passage therethrough past the printhead thereof, said printing medium having a surface for receiving an image from the printhead; and,
- (b) a strip of a covering medium disposed over a surface of said printing medium so as to pass through the facsimile machine in combination with said printing medium, said covering medium having a obscuring portion covering a printing surface of said printing medium upon which the printer prints images, said obscuring portion including means for causing heat produced by the printhead at positions of images to cause printing of said images at corresponding positions of said printing surface; and wherein,
- (c) said printing medium is a thermal paper having a top surface having a coating thereon which changes to a dark and visible color in response to heat; and,
- (d) said covering medium is a covering sheet covering said top surface of said thermal paper, said covering sheet having a high index of thermal conductivity and capable of quickly transmitting heat from the printhead vertically through said covering medium to said coating on said thermal paper, said covering sheet being of a frangible material whereby said covering sheet can be cut by a transverse cutter of a facsimile machine which cuts roll media into sheet lengths.

14. In a facsimile transmission system whereby a document is sent between a sender and a receiver by facsimile and printed by a thermal printhead of a facsimile machine at the receiver, the improved printing media comprising:
- (a) a strip of a flexible printing medium receivable by the facsimile machine for passage therethrough past the printhead thereof, said printing medium having a surface for receiving an image from the printhead; and
- (b) a strip of a covering medium disposed over a surface of said printing medium so as to pass through the facsimile machine in combination with said printing medium, said covering medium having a obscuring portion covering a printing surface of said printing medium upon which the printer prints images, said obscuring portion including means for causing heat produced by the printhead at positions of images to cause printing of said images at corresponding positions of said printing surface; and wherein,
- (c) said printing medium is a plain paper having a top surface; and,
- (d) said covering medium is a covering sheet covering said top surface of said plain paper, said covering sheet having a heat-transferable ink coating on a bottom surface thereof facing said top surface of said plain paper whereby when the printer applies heat to said covering medium said ink adjacent thereto is transferred from said covering medium to said top surface of said plain paper, said covering sheet being of a frangible material whereby said covering sheet can be cut by a transverse cutter of a facsimile machine which cuts roll media into sheet lengths.

* * * * *